United States Patent

Aiken et al.

[11] Patent Number: 5,836,078
[45] Date of Patent: Nov. 17, 1998

[54] APPARATUS FOR REMOVING OR MOUNTING A BEARING CUP

[75] Inventors: Albert Aiken; Johnny N. Smith, both of Toledo, Ohio

[73] Assignee: Dana Corporation, Toledo, Ohio

[21] Appl. No.: 578,275

[22] Filed: Dec. 26, 1995

[51] Int. Cl.⁶ ............................................. B23P 11/00
[52] U.S. Cl. .................... 29/898.07; 29/251; 29/252; 29/898.08; 29/898.01; 29/426.5
[58] Field of Search ................. 29/251, 252, 898.01, 29/259, 263, 426.5, 898.07, 898.08

[56] References Cited

U.S. PATENT DOCUMENTS

| | | |
|---|---|---|
| 3,005,324 | 10/1961 | Zeller . |
| 3,008,226 | 11/1961 | Kellerman . |
| 3,786,544 | 1/1974 | Ferguson .................................. 29/251 |
| 4,104,776 | 8/1978 | Caccioli et al. ........................ 29/251 |
| 4,162,568 | 7/1979 | Spiess . |
| 4,182,011 | 1/1980 | Bretzger . |
| 4,343,075 | 8/1982 | Guptill et al. . |
| 4,437,220 | 3/1984 | Gregory . |
| 4,463,489 | 8/1984 | James . |
| 4,502,197 | 3/1985 | Harder . |
| 4,558,502 | 12/1985 | Gössmann et al. ...................... 29/252 |
| 4,637,806 | 1/1987 | Olschewski et al. . |
| 4,805,281 | 2/1989 | Stark et al. .............................. 29/252 |
| 4,977,660 | 12/1990 | Maynard .................................. 29/251 |
| 5,050,285 | 9/1991 | Wrage . |
| 5,519,928 | 5/1996 | Hardy ...................................... 29/251 |
| 5,564,176 | 10/1996 | Garcia et al. ............................ 29/251 |

FOREIGN PATENT DOCUMENTS 1604192  12/1981  United Kingdom .

*Primary Examiner*—S. Thomas Hughes
*Assistant Examiner*—Marc W. Butler
*Attorney, Agent, or Firm*—MacMillan, Sobanski & Todd, LLC

[57] ABSTRACT

An apparatus is disclosed for positioning a bearing cup with respect to a universal joint having a yoke. The apparatus includes a base. A support is connected to the base and disposed at a distance therefrom. A spacer connects the support to the base and fixes the distance. A ram is mounted on the support. The ram is movable relative to the support and toward the base. Movement of the ram is adapted for positioning the bearing cup with respect to the yoke.

7 Claims, 10 Drawing Sheets

APPARATUS FOR REMOVING OR MOUNTING A BEARING CUP

BACKGROUND OF THE INVENTION

This invention relates in general to universal joints, and in particular to an apparatus for removing or mounting a bearing cup on a cross connected to a yoke of a universal joint.

Universal joints are well known devices which provide a driving connection between two members adapted to rotate about non-aligned axes of rotation. Universal joints are widely used between rotatable drive shaft sections in vehicle drive train systems. A typical universal joint includes a cross having a central body portion with four cylindrical trunnions extending outwardly therefrom. The trunnions are oriented in a single plane and extend at right angles relative to one another. A hollow cylindrical bearing cup is mounted on the end of each of the trunnions. Needle bearings or similar means are provided between the outer cylindrical surfaces of the trunnions and the inner cylindrical surfaces of the bearing cups to permit relative rotational movement therebetween. The bearing cups which are mounted on a first opposed pair of the trunnions can be connected to a first end yoke secured to an end of a first drive shaft section, while the bearing cups mounted on a second opposed pair of the trunnions can be connected to a second end yoke secured to an end of a second drive shaft section.

A full round end yoke is a common type of end yoke for use in a universal joint. The full round end yoke includes a body portion having a pair of opposed arms extending therefrom. Each of the opposed arms has a cylindrical opening formed through the end thereof. The openings are aligned with one another. When a universal joint is assembled with the full round end yoke, an opposed pair of trunnions is received in the openings. Then the bearing cups are mounted over the ends of the trunnions by forcing the bearing cups into the cylindrical openings.

At times there is a need to remove the bearing cups from the assembled universal joint. For example, the bearing cups are removed for servicing after a period of use. Such servicing can include cleaning and lubricating the bearings, or replacing the bearings or bearing cups. Unfortunately, a bearing cup is very difficult to remove after it has been installed in the universal joint. For one thing, the bearing cup is very tightly positioned in the opening of the end yoke, so that it is difficult to pull the bearing cup out of the end yoke. For another thing, the end yoke limits physical access to the bearing cup for tools to facilitate removal.

Prior methods for removing a bearing cup from an assembled universal joint have not been totally satisfactory. For example, a typical method to remove bearing cups in a servicing facility is by the use of a heavy press such as an Arbor press. However, such a press is very expensive. Further, the press is not portable so that a universal joint cannot be serviced unless it can be brought to the facility. Often there is a need to service universal joints at a location where such a press is not available. Other methods have involved the use of various power tools. However, a source of electric power is not always available. Such methods are often impractical. Other methods have involved physical means of removal, such as striking the cross with a hammer. Such methods are often difficult and time consuming and can damage the universal joint.

Certain kinds of universal joints present particular difficulties in removing the bearing cups. For example, in a very large universal joint, the parts are heavier and they have more surface area. Thus, there is more friction between the bearing cup and the opening of the end yoke, and the bearing cup must be pulled a longer distance out of the opening for removal.

It would therefore be desirable to provide a portable, inexpensive apparatus for easily and quickly removing a bearing cup from an assembled universal joint, without damaging the universal joint and without requiring the use of power tools. It would also be desirable to provide an apparatus useful for remounting a bearing cup in an assembled universal joint after it has been removed and serviced.

SUMMARY OF THE INVENTION

This invention relates to an apparatus for removing or mounting a bearing cup with respect to a universal joint having a yoke. The apparatus includes a base which is preferably generally shaped as a plate. The base can include an orifice for receiving the bearing cup therethrough. A support is connected to the base and disposed at a distance therefrom. Preferably, the support is generally shaped as a plate and is oriented generally parallel with the base. The support includes an orifice which is aligned with the orifice of the base. A spacer connects the support to the base and fixes the distance therebetween. Preferably, the spacer is adjustable to allow adjustment of the distance. A ram such as a hydraulic piston is mounted on the support. The ram is movable through the orifice of the support and toward the base. The base can include positioners to align the yoke with respect to the ram. Movement of the ram is adapted for removing or mounting the bearing cup with respect to the yoke. The invention also relates to a method for removing a bearing cup from a universal joint, and a method for mounting a bearing cup thereon.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
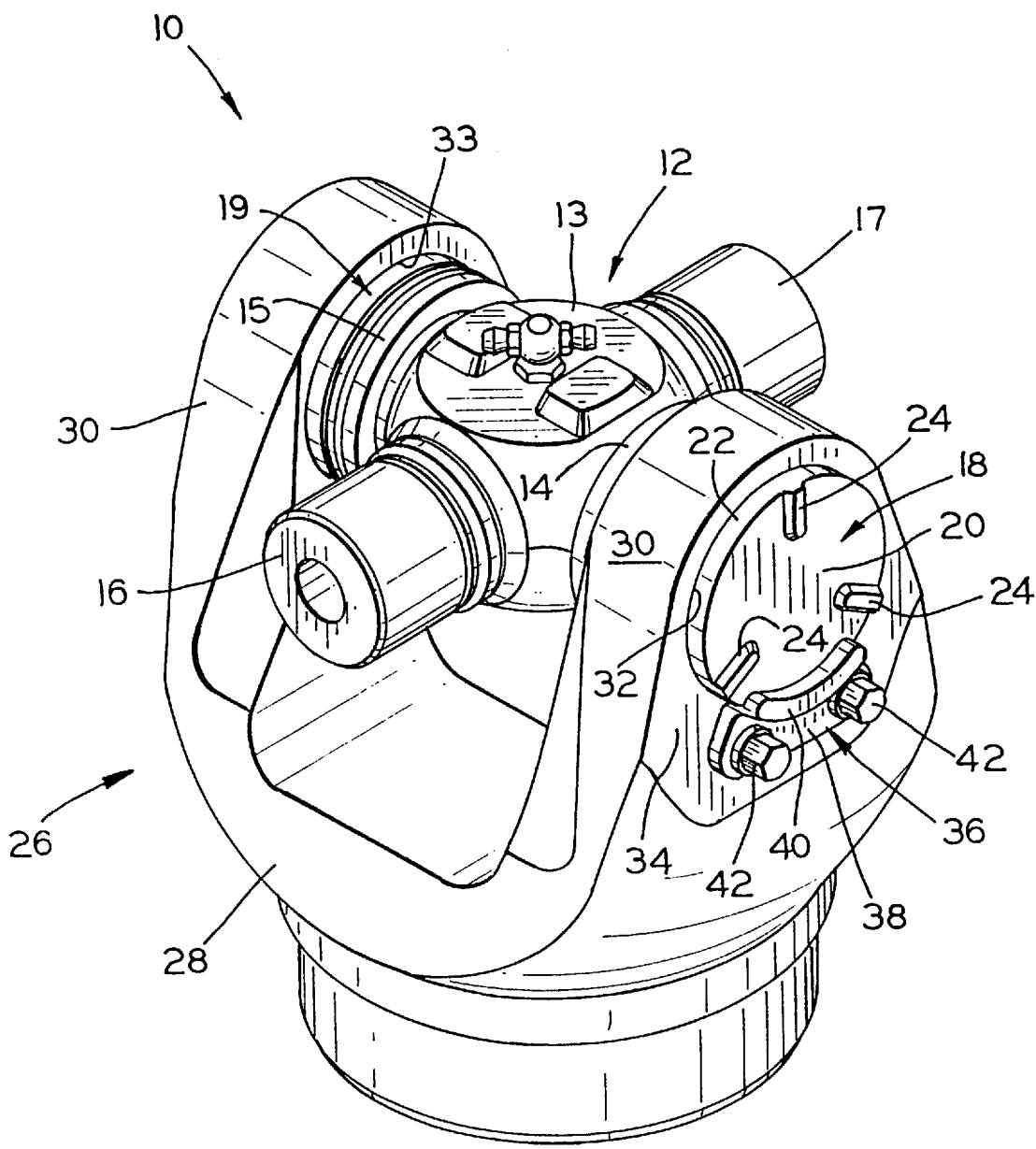
FIG. 1 is a perspective view of a universal joint including a cross with bearing cups connected to a yoke.
Figure 2:
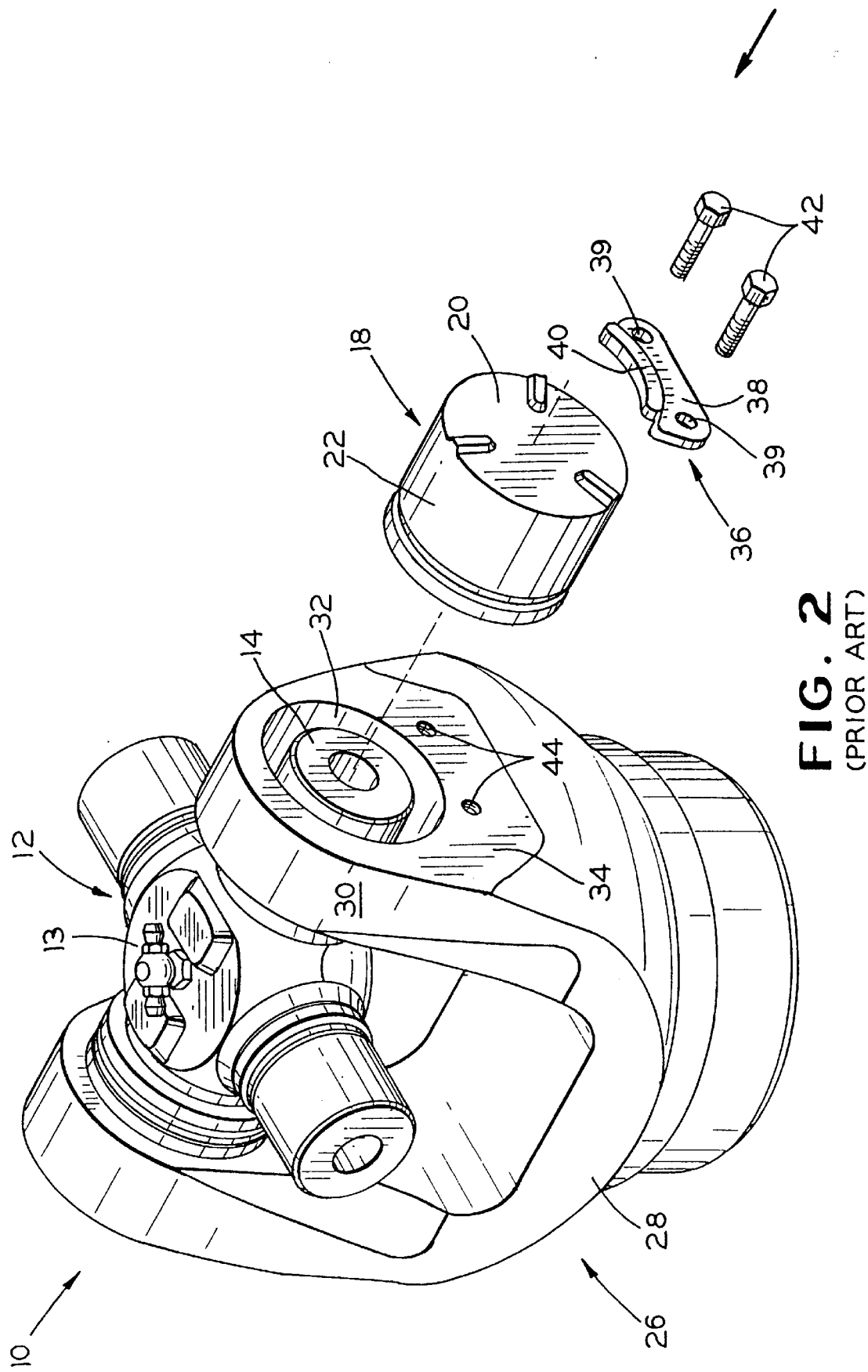
FIG. 2 is a partially exploded perspective view of the universal joint of FIG. 1.

Referring now to the drawings, there is illustrated in FIGS. 1 and 2 a universal joint, indicated generally at 10. The universal joint 10 includes a cross, indicated generally at 12. The cross 12 includes a central body portion 13. The cross 12 further includes four cylindrical trunnions 14–17. The trunnions 14–17 extend radially outwardly from the body portion 13 in a common plane at right angles relative to one another. A first bearing cup 18 and a second bearing cup 19 are mounted on the end of each of a pair of opposed trunnions, first trunnion 14 and second trunnion 15. In operation, bearing cups would be mounted on the other pair of opposed trunnions 16 and 17 for connection to another end yoke. Needle bearings (not shown) or similar bearing means are provided between each of the first and second bearing cups 18 and 19 and the associated first and second trunnions 14 and 15 to permit low friction rotational movement to occur therebetween. Each of the first and second bearing cups 18 and 19 is formed generally in the shape of a hollow cylinder. As can be seen with respect to first bearing cup 18, each has a closed, circular end surface 20 and an outer cylindrical surface 22. Each bearing cup has axially extending anti-rotation protrusions 24 formed on the end surface 20. The purpose of the protrusions 24 will be explained below.

The universal joint 10 illustrated in FIG. 1 further includes a full round end yoke, indicated generally at 26. The end yoke 26 includes a body portion 28 having a pair of opposed arms 30 extending therefrom. Each of the opposed arms 30 has a cylindrical opening formed therethrough, a first opening 32 in one of the arms and a second opening 33 in the other arm. The first and second openings 32 and 33 are aligned with one another. A machined outer surface 34 is formed about each of the openings 32 and 33. A pair of threaded apertures 44 is formed in each outer surface 34. When the cross 12 is assembled with the end yoke 26, the opposed first and second trunnions 14 and 15 are received in the openings 32 and 33. Then the first and second bearing cups 18 and 19 are mounted over the ends of the trunnions 14 and 15 by forcing the bearing cups into the openings.

A pair of spring tabs 36 (one of which is shown) is provided for retaining each of the bearing cups 18 and 19 within the openings 32 and 33 of the end yoke 26. Each spring tab 36 includes a base portion 38 and an angled end portion 40. The base portion 38 includes a pair of apertures 39. A pair of threaded fasteners 42 extends through the apertures 39 and into the threaded apertures 44 of the end yoke 26 to secure the base portion 38 thereto. The end portion 40 extends over the end surface 20 of the bearing cup to retain it within the opening. The end portion 40 also cooperates with the protrusions 24 to prevent rotation of the bearing cup when the drive shaft is operated. When the bearing cup attempts to rotate relative to the end yoke 26, the end portion 40 engages the protrusions 24 to prevent such rotation. This prevents wear of the bearing cup and end yoke and avoids problems associated with such wear.

FIG. 2 best illustrates the positioning of the first bearing cup 18, cross 12 and end yoke 26. The arm 30 of the end yoke 26 includes a first opening 32 formed therethrough. A machined outer surface 34 is formed about the first opening 32. A pair of threaded apertures 44 is formed in the outer surface 34. The cross 12 includes an outwardly extending first trunnion 14. When the cross 12 is assembled with the end yoke 26, the first trunnion 14 is received in the first opening 32. The first bearing cup 18 includes an end surface 20 and an outer cylindrical surface 22. The first bearing cup 18 is mounted over the end of the first trunnion 14 by forcing the first bearing cup 18 into the opening 32. After mounting, the outer cylindrical surface 22 of the first bearing cup 18 is tightly positioned in the first opening 32. The first trunnion 14 is disposed inside the first bearing cup 18 and rotatable relative thereto. The end surface 20 of the first bearing cup 18 extends beyond the outer surface 34 of the arm 30 by a predetermined small distance. The spring tab 36 includes a base portion 38 and an end portion 40. The base portion 38 includes a pair of apertures 39 formed therethrough. The base portion 38 is secured to the outer surface 34 of the arm 30 by a pair of threaded fasteners 42 which extend through the apertures 39 and into the threaded apertures 44. The end portion 40 extends over the end surface 20 of the first bearing cup 18 and retains it within the first opening 32. In the same manner (not shown in FIG. 2), the second bearing cup 19 is mounted on the second trunnion 15 within the second opening 33.

Figure 3:
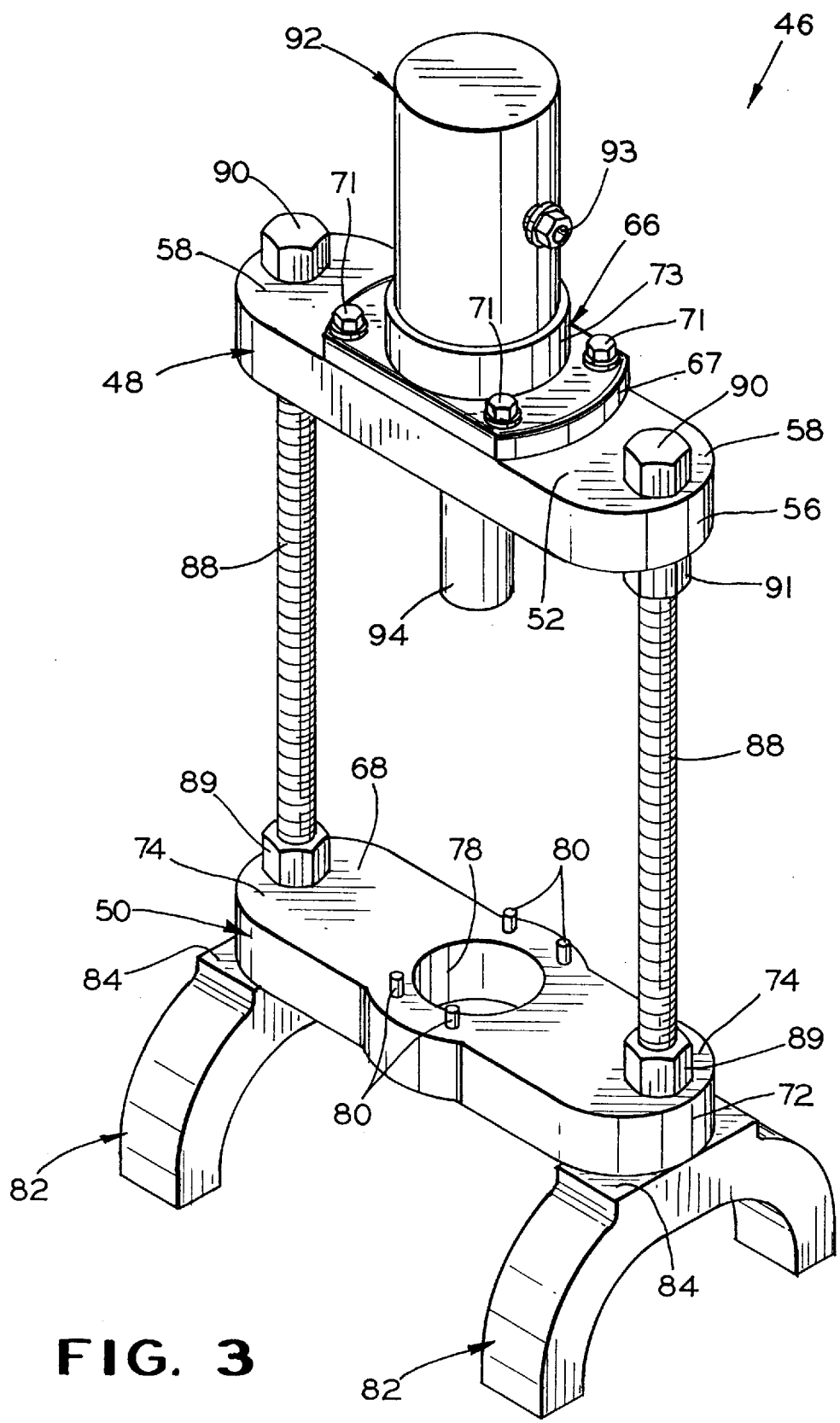
FIG. 3 is a perspective view of an apparatus for removing or mounting a bearing cup in accordance with this invention.
Figure 4:
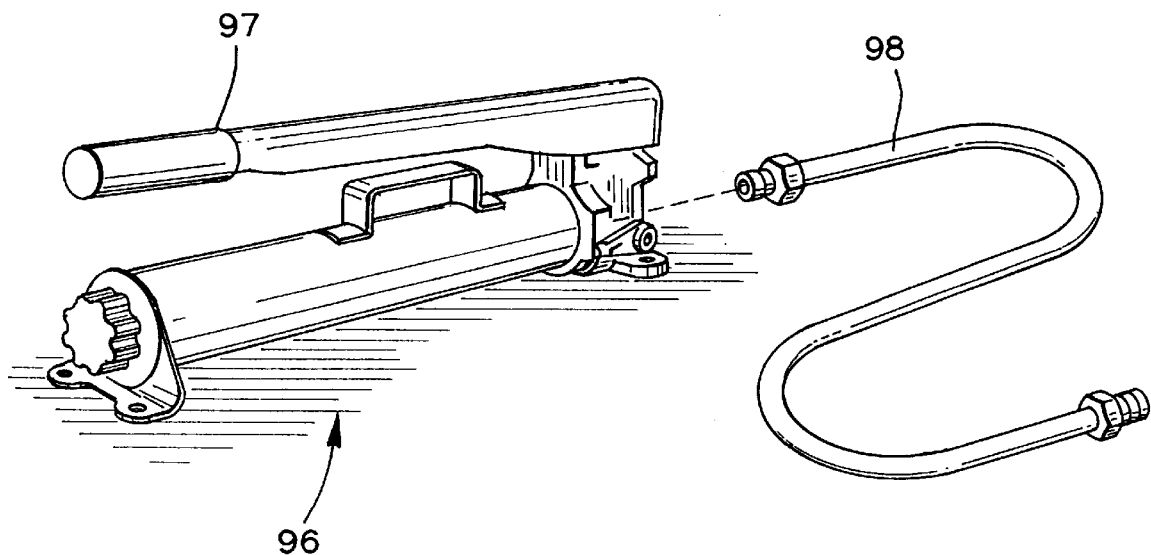
FIG. 4 is a perspective view of a suitable hydraulic pump for use with the apparatus.
Figure 5:
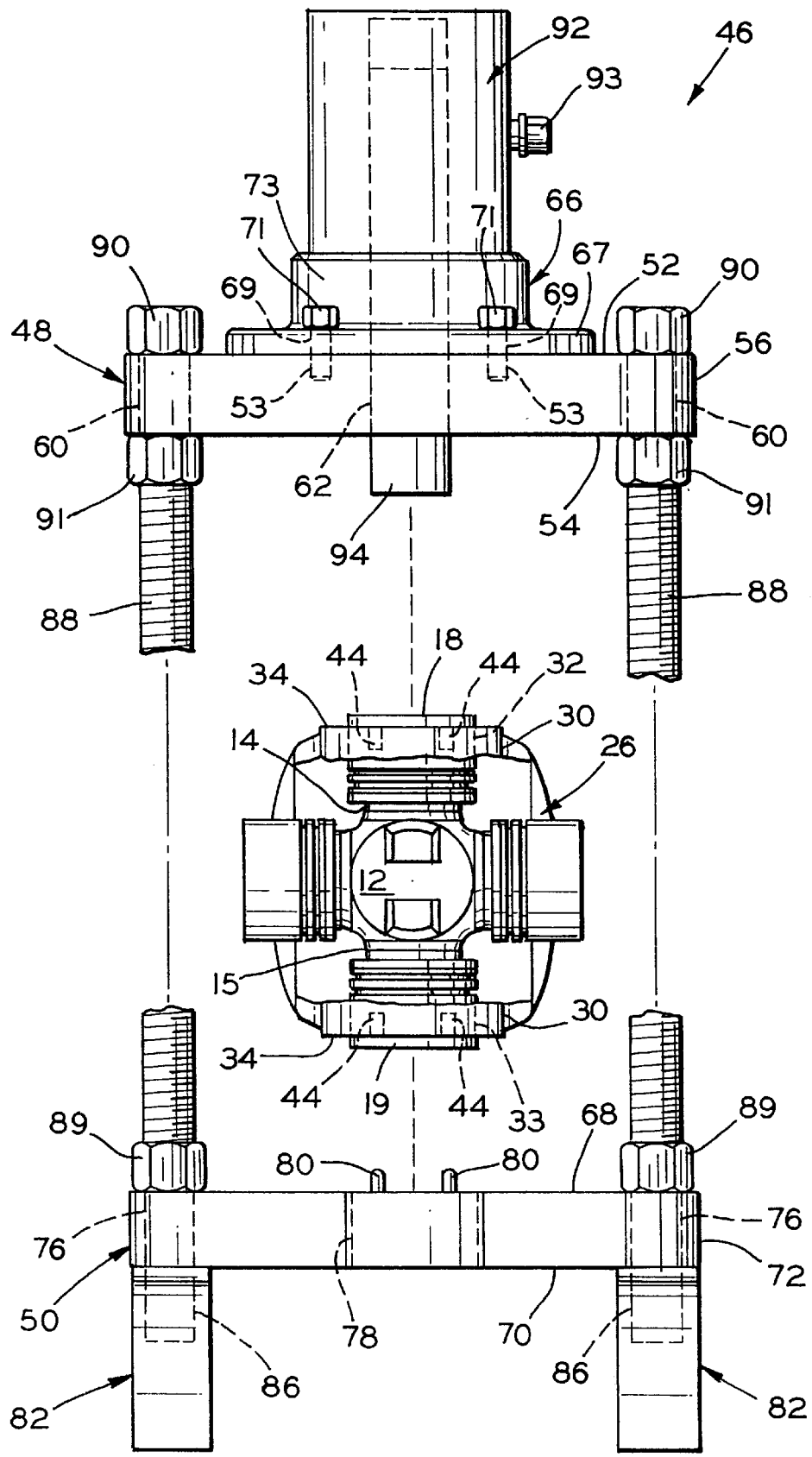
FIG. 5 is an elevational view of the apparatus of FIG. 3 in an open position, with a yoke and cross disposed between the base and support of the apparatus, prior to removing a bearing cup.

Referring now to FIGS. 3 through 5, an apparatus for removing or mounting a bearing cup in accordance with this invention is indicated generally at 46. The apparatus 46 includes a support 48. Preferably the support 48 is shaped generally in the form of a plate. It includes opposing upper and lower surfaces 52 and 54. The upper surface 52 is generally parallel with the lower surface 54. A plurality of threaded apertures 53 are formed in the upper surface 52. An edge surface 56 circumscribes the upper and lower surfaces 52 and 54. It extends generally perpendicularly between the upper surface 52 and the lower surface 54. The support 48 includes rounded ends 58. A non-threaded aperture 60 is formed through each end 58 of the support 48, extending between the upper surface 52 and the lower surface 54. The support 48 includes a generally cylindrical orifice 62 formed therethrough, and positioned about one-half the distance between the ends 58. The orifice 62 extends between the upper surface 52 and the lower surface 54.

The apparatus 46 also includes a base 50. The base 50 is preferably shaped substantially identical to the support 48, and it is aligned therewith. Preferably the base 50 is shaped generally in the form of a plate. It includes opposing upper and lower surfaces 68 and 70. The upper surface 68 is generally parallel with the lower surface 70. An edge surface 72 circumscribes the upper and lower surfaces 68 and 70. It extends generally perpendicularly between the upper surface 68 and the lower surface 70. The base 50 includes rounded ends 74. A threaded aperture 76 is formed through each end 74 of the base 50, extending between the upper surface 68 and the lower surface 70. The threaded apertures 76 of the base 50 are aligned with the non-threaded apertures 60 of the support 48. Preferably the base 50 includes a generally cylindrical orifice 78 formed therethrough, and positioned about one-half the distance between the ends 74. The orifice 78 extends between the upper surface 68 and the lower surface 70. The orifice 78 of the base 50 is aligned with the orifice 62 of the support 48. However, the orifice 78 of the base 50 is larger than the orifice 62 of the support 48 and is adapted to receive a bearing cup therein. Preferably the base 50 includes positioners to align the end yoke with the piston 94 described below. In the illustrated embodiment, two pairs of spring loaded positioning pins 80 are positioned in the upper surface 68. The pairs of positioning pins 80 are formed about opposing sides of the orifice 78.

As shown in FIG. 3, preferably the support 48 is an upper portion of the apparatus 46 and the base 50 is a lower portion. The support 48 and base 50 can be formed from any strong material such as metals, plastics or composites, and preferably from steel or steel alloy.

A generally semicircular foot 82 is provided under each end 74 of the base 50. A flat portion 84 formed on each foot 82 lies adjacent to the lower surface 70 of the base 50. The feet 82 thus support the apparatus 46 in an upright position and elevate the base 50 a distance above the supporting surface. Each foot 82 includes a threaded aperture 86 formed therethrough and aligned with a threaded aperture 76 of the base 50.

The apparatus 46 also includes a spacer connecting the support 48 to the base 50 and fixing the distance therebetween. In the illustrated embodiment, the spacer comprises a pair of threaded fasteners 88 such as threaded bolts or threaded rods. The threaded fasteners 88 extend between the support 48 and the base 50, and into the foot 82. Each threaded fastener 88 includes a head 90. A nut 91 is positioned on the threaded fastener 88 a short distance from the head 90. Each threaded fastener 88 extends through the non-threaded aperture 60 in the support 48, with the support 48 positioned between the head 90 and the nut 91. The threaded fastener 88 is rotatable within the non-threaded aperture 60, with the support 48 remaining positioned between the head 90 and the nut 91. Each threaded fastener 88 also extends through the threaded apertures 76 and 86 in the base 50 and foot 82, respectively. A nut 89 is positioned on each threaded fastener 88 adjacent to the upper surface 68 of the base 50. By turning the head 90 of each threaded fastener 88 in the one direction, usually clockwise, the threaded fastener is moved downward through the threaded apertures 76 and 86, and the support 48 is moved closer to the base 50. By turning the head 90 of each threaded fastener 88 in the other direction, usually counterclockwise, the threaded fastener is moved upward through the threaded apertures 76 and 78, and the support 48 is moved farther apart from the base 50. The nut 89 is adjusted accordingly. Thus, the support 48 and base 50 are movably connected between an open position where the support 48 is farther apart from the base 50, and a closed position where the support 48 is closer to the base 50. However, even in the closed position the support 48 is disposed at a distance from the base 50.

In an alternative structure (not shown), the spacer comprises a pair of threaded rods. The rods extend through threaded apertures in the support, base and foot. The threaded apertures in the support are threaded in the reverse direction from the threaded apertures in the base and foot. Thus, rotation of the rods in one direction causes the support to move farther apart from the base, while rotation of the rods in the other direction causes the support to move closer to the base.

Figure 6:
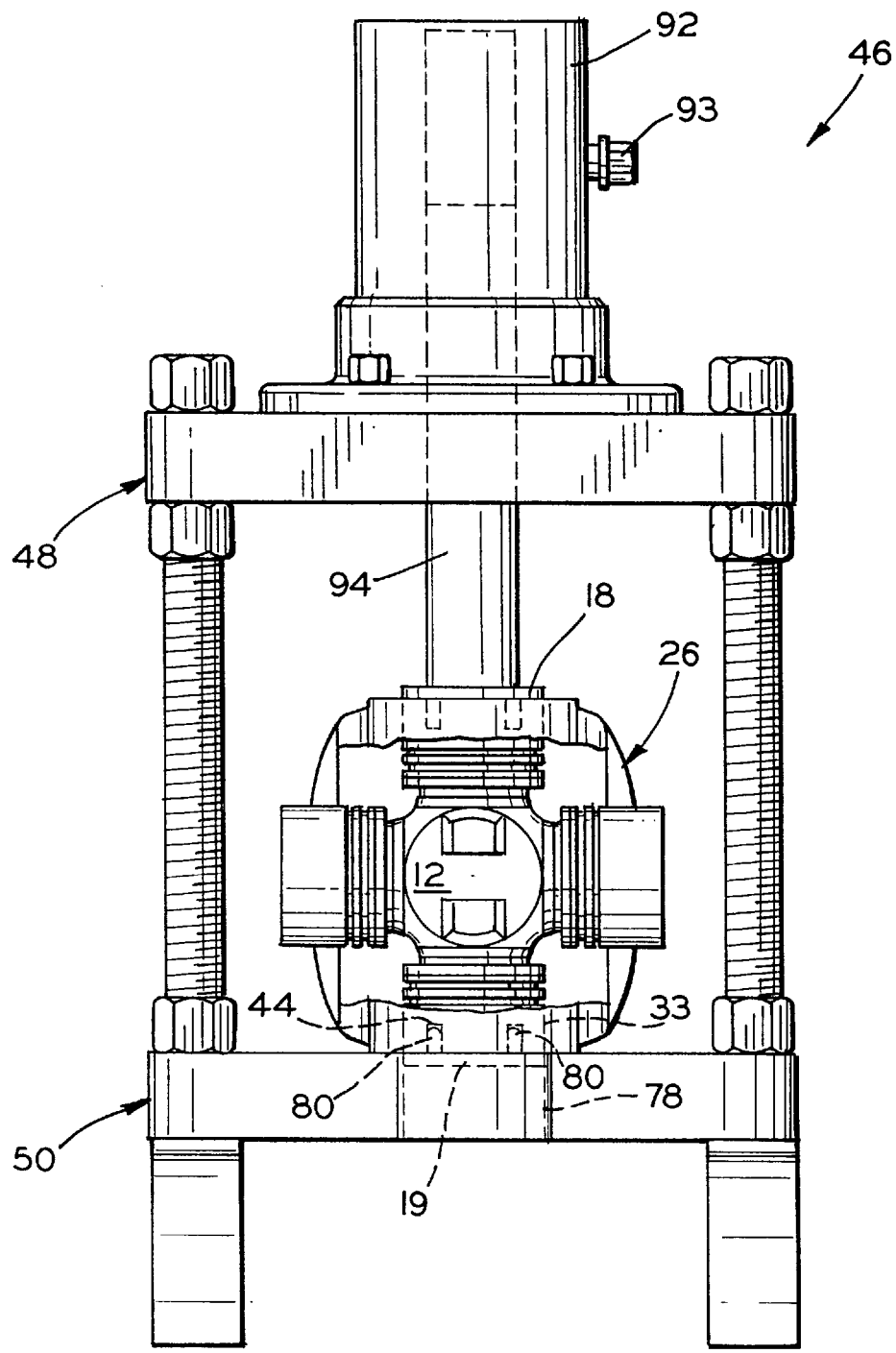
FIG. 6 is a view as in FIG. 5 with the apparatus in a closed position and a piston moved downward with respect to the support and adjacent to a bearing cup.
Figure 7:
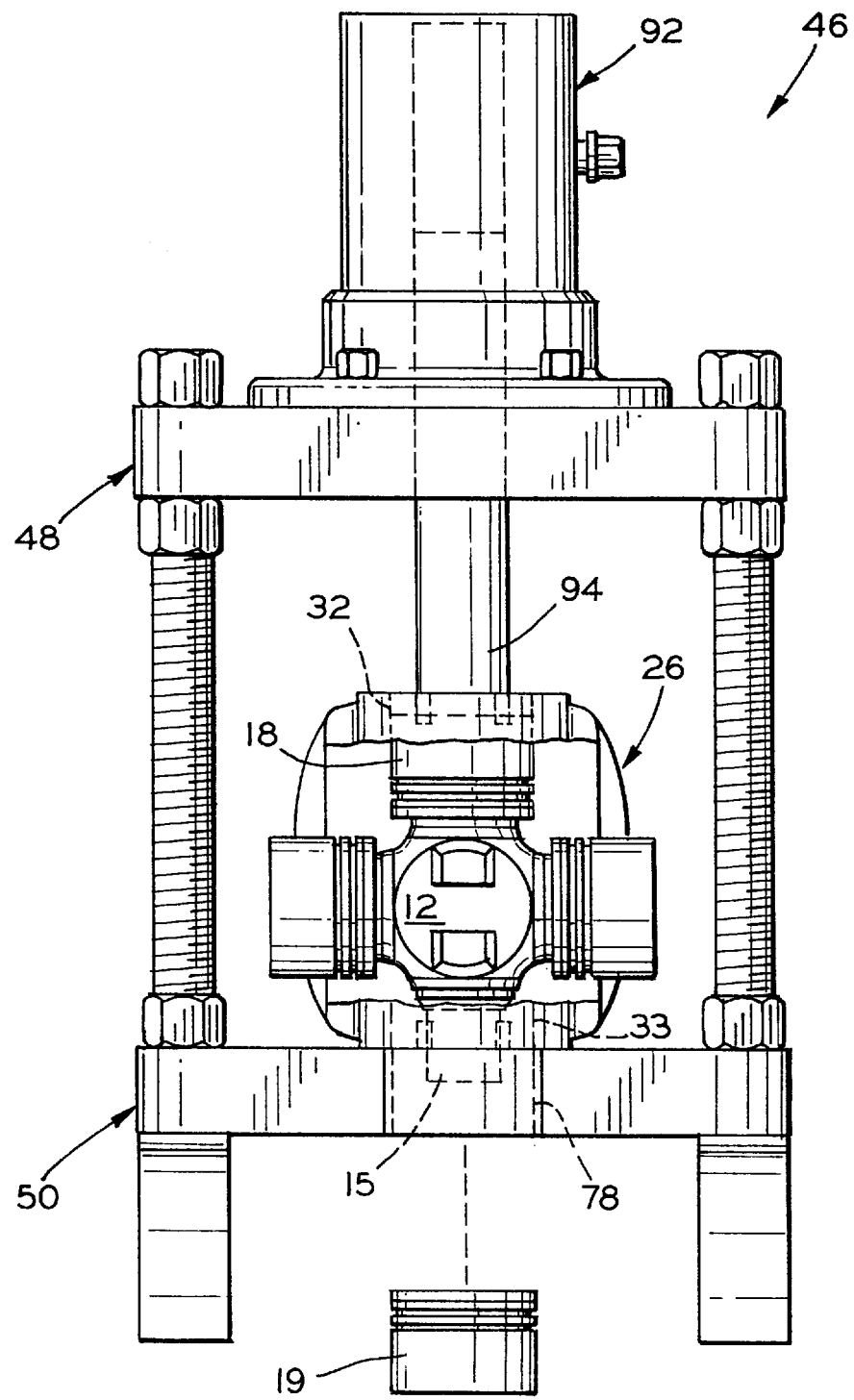
FIG. 7 is a view as in FIG. 6 after the piston has forced down the cross relative to the yoke and a bearing cup has been removed.

The apparatus 46 further includes a coupling 66, disposed on the upper surface 52 of the support 48. The coupling 66 includes a base portion 67. A plurality of threaded apertures 69 are formed through the base portion 67. A plurality of threaded fasteners 71 extend through the threaded apertures 69 of the base portion 67 and into the threaded apertures 53 of the support 48, to secure the coupling 66 to the support 48. The coupling 66 further includes a hollow cylindrical portion 73 extending upward from and through the base portion 67, and formed integrally therewith. The cylindrical portion 73 is disposed adjacent to the orifice 62 of the support 48. A hollow cylinder 92 is connected to the coupling 66 by opposing threads (not shown) formed on the exterior of the cylinder 92 and the interior of the cylindrical portion 73 of the coupling 66. The cylinder 92 includes an inlet 93 for connection to a hydraulic pump 96. The hydraulic pump 96 can be a hand-operated pump as shown in FIG. 4. Pumping the arm 97 causes the flow of hydraulic fluid out of the pump and through the hose 98. The hose 98 is connected to the inlet 93 of the cylinder 92. A generally cylindrical piston 94 is disposed in the cylinder 92. The piston 94 extends through the orifice 62 of the support 48 and downward toward the base 50. Pumping the hydraulic pump 96 causes the flow of hydraulic fluid through the inlet 93 into the cylinder 92. The resulting hydraulic pressure forces the piston 94 downward with respect to the cylinder 92 so that it extends further downward relative to the support 48. Thus, the piston 94 functions as a ram which is movable relative to the support 48 and toward the base 50., FIGS. 5 through 7 illustrate the method for removing a bearing cup in accordance with this invention. As shown in FIG. 5, the apparatus includes a support 48 and a base 50. The support 48 includes an orifice 62 formed therethrough. The base 50 includes a larger orifice 78 formed therethrough. Two pairs of positioning pins 80 (one pair is shown) are formed integrally with the upper surface 68 of the base 50. The support 48 and base 50 have been moved to an open position where they are farther apart from one another (shown in an exaggerated fashion). This facilitates the positioning of the end yoke 26 and cross 12 between the support 48 and base 50. However, it is not critical that the support 48 and base 50 are adjustably connected to one another, so long as there is sufficient space therebetween for positioning the end yoke 26 and cross 12. The end yoke 26 includes opposed arms 30 having aligned first opening 32 and second opening 33 formed therethrough. Each arm 30 includes an outer surface 34 having a pair of threaded apertures 44 formed therein. The cross 12 includes opposed first trunnion 14 and second trunnion 15 having first bearing cup 18 and second bearing cup 19 mounted thereon. The first bearing cup 18 and second bearing cup 19 are disposed within the first opening 32 and second opening 33 of the end yoke 26, respectively. The cross 12 and end yoke 26 are positioned on the upper surface 68 of the base 50 by placing the threaded apertures 44 of the lower arm 30 onto a pair of positioning pins 80. Because the positioning pins 80 are spring loaded, the other pair of positioning pins 80 lies under the arm 30.

FIG. 6 shows that after the cross 12 and end yoke 26 have been positioned, the support 48 and base 50 are moved to the closed position where they are closer to one another. The cross 12 and end yoke 26 are disposed against the base 50. The second bearing cup 19 is disposed adjacent to and partially inside the orifice 78 of the base 50. The support 48 is disposed a short distance above the end yoke 26. The first bearing cup 18 is disposed toward the support 48 and aligned with the piston 94. The hydraulic pump has been operated to cause the flow of hydraulic fluid through the inlet 93 into the cylinder 92. As a result, the piston 94 extends downward from the support 48 and adjacent to the first bearing cup 18.

In the next step of the method shown in FIG. 7, the hydraulic pump is further operated to force the piston 94 to extend further downward. The piston 94 forces the first bearing cup 18 downward and mostly through the first opening 32. As a result, the entire cross 12 is moved downward relative to the end yoke 26. The downward movement of the cross 12 forces the second bearing cup 19 downward and mostly through the second opening 33. As the second bearing cup 19 moves downward, it extends into the orifice 78 of the base. The second bearing cup 19 can fall off the second trunnion 15 and pass through the orifice 78 as shown in FIG. 7, or it can easily be pulled off the second trunnion.

The first bearing cup 18 is removed from the cross 12 in a similar manner. The cross 12 and end yoke 26 are turned upside down (rotated 180°) (not shown). Then the apertures 44 of the arm 30 are placed onto a pair of positioning pins 80 of the base 50. Then the support 48 and base 50 are moved to a closed position with the cross 12 and end yoke 26 positioned therebetween. The first bearing cup 18 is disposed adjacent to the orifice 78 of the base 50. The second trunnion 15 is disposed toward the support 48 and aligned with the piston 94. The hydraulic pump 96 is operated to force the piston 94 downward against the second trunnion 15. The second trunnion 15 is forced downward and mostly through the second opening 33. As a result, the entire cross 12 is moved downward relative to the end yoke 26. The downward movement of the cross 12 forces the first bearing cup 18 downward and mostly through the first opening 32. The first bearing cup 18 can fall through the orifice 78, or it can be pulled off the first trunnion 14.

Figures 8, 9:
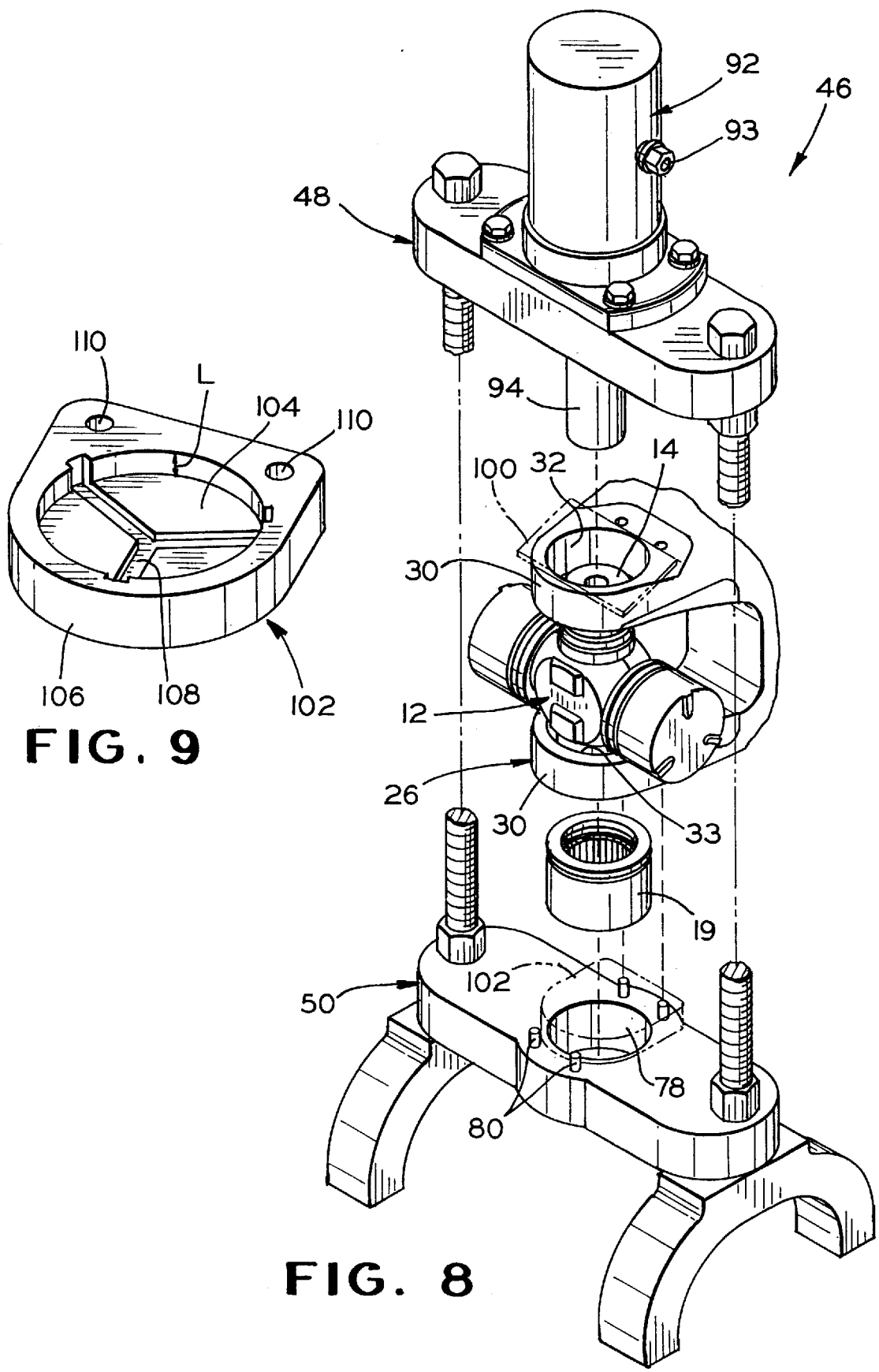
FIG. 8 is a perspective view of the apparatus of FIG. 3 in an open position, with a yoke and cross disposed between the base and support of the apparatus, prior to mounting a first bearing cup.
FIG. 9 is an enlarged perspective view of a tool for positioning a bearing cup with respect to a cross.
Figure 10:
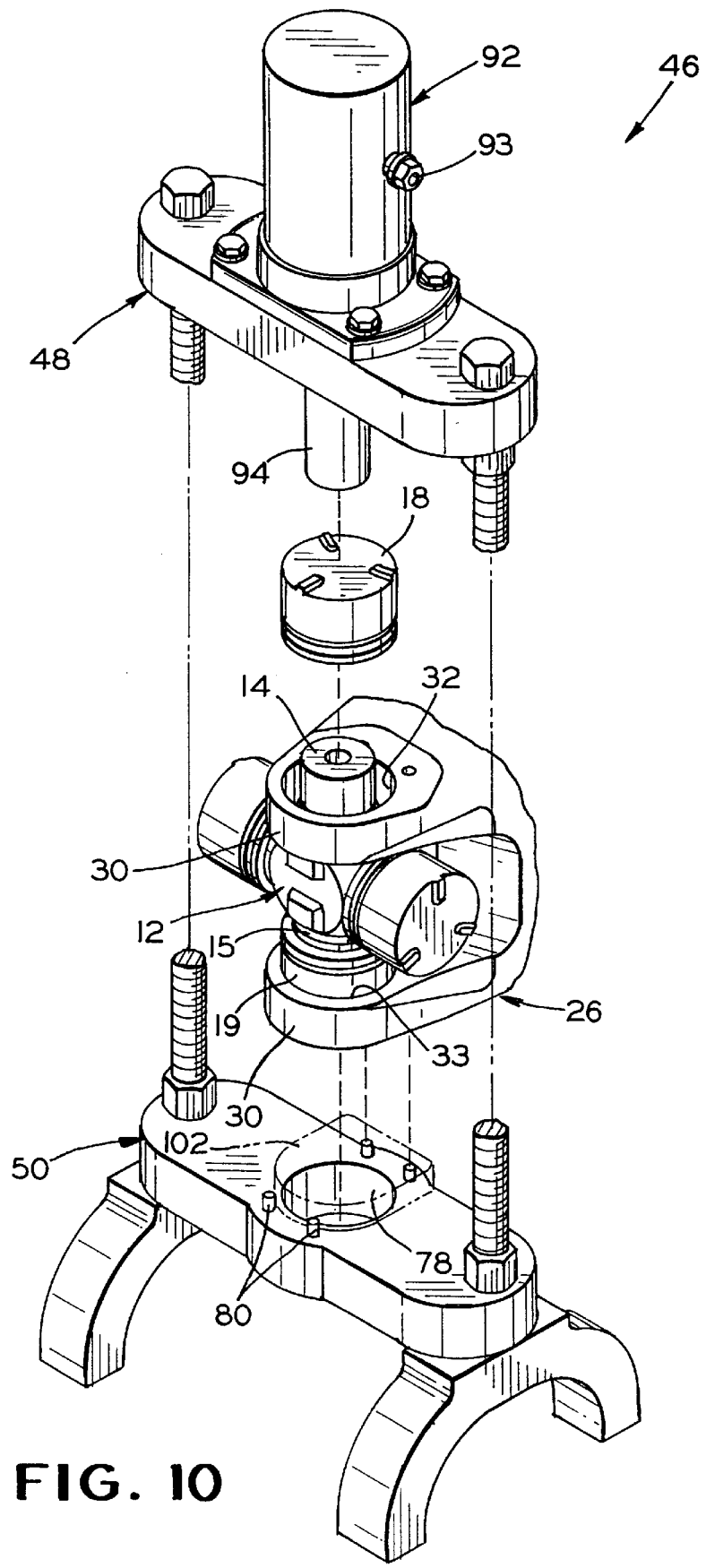
FIG. 10 is a view as in FIG. 8 after the first bearing cup has been mounted and a second bearing cup is positioned for mounting.

FIGS. 8 through 10 illustrate the method for mounting a pair of bearing cups 18 and 19 in accordance with this invention. As shown in FIG. 8, the apparatus 46 includes a support 48 and a base 50. The support 48 and base 50 have been moved to an open position where they are farther apart from one another (shown in an exaggerated fashion). This facilitates the positioning of the end yoke 26 and cross 12 between the support 48 and base 50. The end yoke 26 includes opposed arms 30 having aligned first opening 32 and second opening 33 formed therethrough. The cross 12 includes opposed first trunnion 14 and second trunnion 15. The apparatus 46 preferably includes a generally rectangular plate 100 adapted for positioning between the piston 94 and the end yoke 26 to facilitate mounting of the second bearing cup 19.

The apparatus 46 further includes a tool 102 for axially positioning the first and second bearing cups 18 and 19 within the first and second openings 32 and 33 of the end yoke 26. FIG. 9 illustrates the tool 102 in more detail. The tool 102 is formed generally in the shape of a shallow cup. It includes a generally circular end portion 104 and a generally cylindrical skirt portion 106 formed integrally therewith. The skirt portion 106 has an inner axial length L. Referring again to FIG. 1, when the tool 102 is used for positioning the first and second bearing cups 18 and 19, the inner axial length L is equal to a predetermined distance by which it is desired that the end surface 20 of each of the first and second bearing cups 18 and 19 extends above the outer surface 34 of the arm 30 of the end yoke 26. A generally Y-shaped groove 108 is formed in the inner surface of the end portion 104 of the tool 102. When the tool 102 is used to mount a bearing cup, the protrusions 24 formed on the end surface 20 of the bearing cup extend into the groove 108. The tool 102 further includes a pair of apertures 110 formed through the end portion 104. When the tool 102 is used to mount a bearing cup, a first pair of positioning pins 80 of the base 50 extends through the apertures 110, and a second pair of positioning pins 80 extends adjacent to the skirt portion 106 of the tool 102. In this manner, the tool 102 is positioned on the base 50 of the apparatus 46.

Referring again to FIG. 8, the tool 102 is positioned on the base 50. The second bearing cup 19 is positioned inside the tool 102 on the base 50. The cross 12 and end yoke 26 are positioned over the second bearing cup 19. The second bearing cup 19 is disposed partially over the second trunnion 15 and partially inside the second opening 33 of the end yoke 26. The plate 100 is positioned between the end yoke 26 and the piston 94. The support 48 and base 50 are then moved to the closed position.

The next step of the method is to pump the hydraulic pump to cause the flow of hydraulic fluid through the inlet 93 of the cylinder 92. As illustrated in FIG. 7, the resulting hydraulic pressure forces the piston 94 to extend downward out of the cylinder 92. The piston 94 is forced down onto the plate 100. This forces the cross 12 and end yoke 26 down onto the second bearing cup 19. As a result, the second trunnion 15 of the cross 12 is forced down into the second bearing cup 19, and the second opening 33 of the end yoke 26 is forced down around the second bearing cup 19. Thus the second bearing cup 19 is mounted on the second trunnion 15 within the second opening 33.

The first bearing cup 18 is mounted on the first trunnion 14 as shown in FIG. 10. The cross 12 and end yoke 26 remain positioned on the base 50. The piston 94 is retracted into the cylinder 92. Then the first bearing cup 18 is positioned partially over the first trunnion 14 and partially inside the first opening 32 of the end yoke 26. Then the hydraulic pump is operated to cause the flow of hydraulic fluid through the inlet 93 of the cylinder 92. The resulting hydraulic pressure forces the piston 94 to extend downward out of the cylinder 92 as shown in FIG. 7. The piston 94 pushes downward against the first bearing cup 18, which forces the first bearing cup 18 down into the first opening 32 and over the first trunnion 14. Thus, the first bearing cup 18 is mounted on the first trunnion 14 within the first opening 32. Because the second bearing cup 19 is axially positioned at a desired position with respect to the end yoke 26, the first bearing cup 18 on the opposed end of the cross 12 is also axially positioned at the desired position. However, optionally a second tool 102 (not shown) can be used between the first bearing cup 18 and the piston 94 when mounting the first bearing cup.

Figure 11:
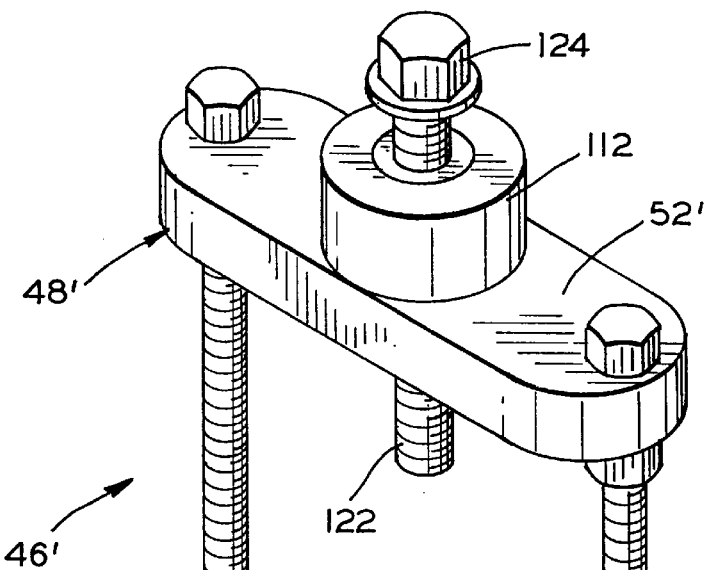
FIG. 11 is a perspective view of a second embodiment of an apparatus for removing or mounting a bearing cup in accordance with this invention.
Figure 12:
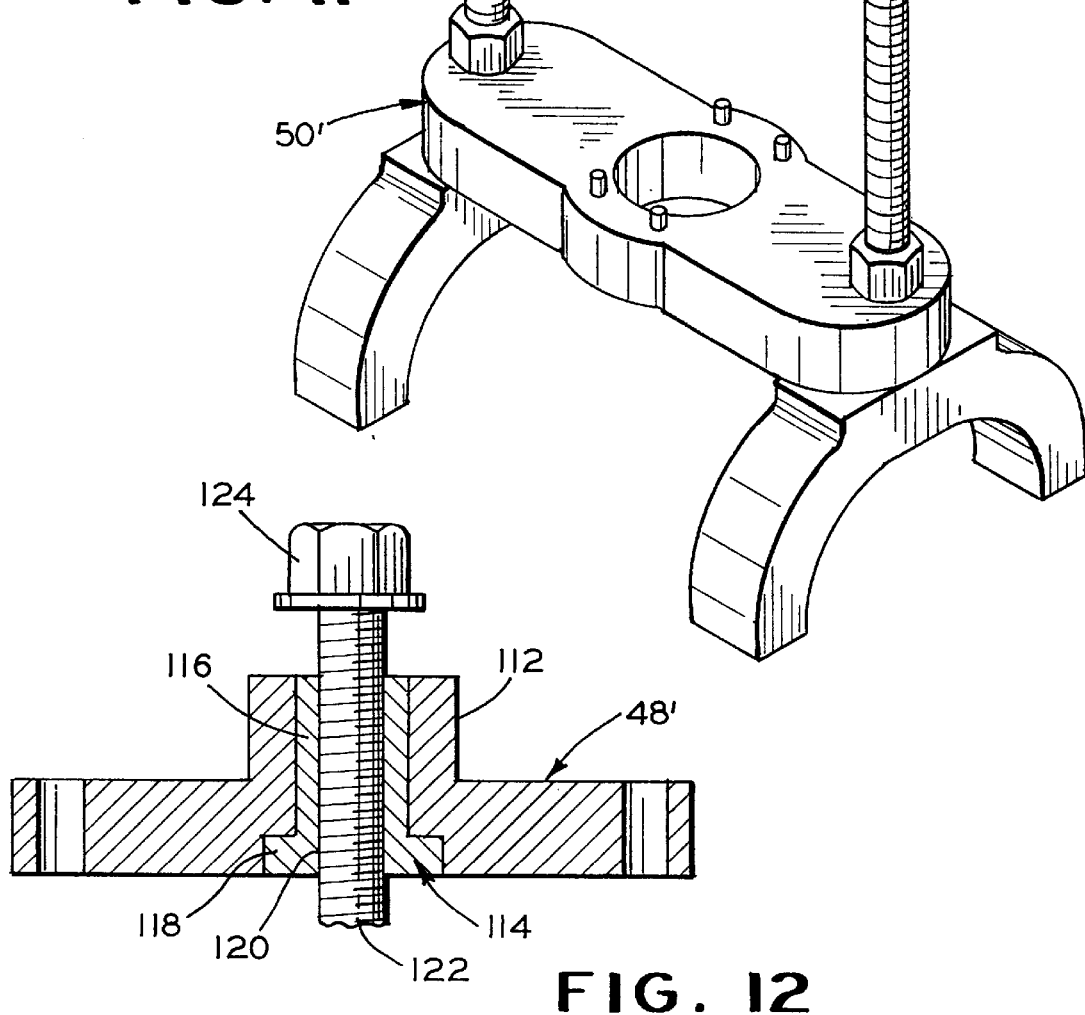
FIG. 12 is a cross-sectional view of a threaded member moved downward relative to the support of the apparatus of FIG. 11.

FIGS. 11 and 12 illustrate a second embodiment of an apparatus 46' in accordance with this invention. The apparatus 46' is substantially identical to the apparatus 46 which has been described above, and includes a support 48' and a base 50'. However, the apparatus 46' does not include a cylinder 92 connected to a coupling 66. Rather, a coupling 112 is formed integrally with the upper surface 52' of the support 48'. The coupling 112 is generally cylindrical in form. An insert 114 is positioned tightly through the center of the coupling 112. The insert 114 includes a generally cylindrical upper portion 116 and a generally rectangular lower portion 118 formed integrally therewith. The insert 114 is usually formed from a metallic material such as steel. A threaded aperture 120 is formed through the center of the insert 114. A threaded member 122 such as a threaded bolt or threaded rod is disposed within the threaded aperture 120. The threaded member 122 includes a head 124. An industrial wrench (not shown) or similar tool can be used to rotate the head 124. This rotates the threaded is member 122 within the threaded aperture 120. When the threaded member 122 is rotated in the clockwise direction, the threaded member 122 is moved downward within the threaded aperture 120. Thus the threaded member 122 can function as a ram similar to the piston 94 of the first embodiment of the apparatus 46.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for installing a bearing cup on a universal joint including a cross having first and second trunnions and a yoke having first and second openings formed therethrough, said method comprising the steps of:

(a) providing an apparatus including a base, a support disposed at a distance from the base, and a ram carried on the support and selectively movable toward the base;

(b) positioning the bearing cup adjacent to the base;

(c) positioning the cross such that the second trunnion is aligned with the bearing cup;

(d) positioning the yoke such that the first and second openings are respectively disposed about the first and second trunnions; and (e) moving the ram into engagement with the yoke so as to move the yoke relative to the base such that the bearing cup is moved into the first opening and about the second trunnion.

2. The method defined in claim 1 wherein said step (a) is performed by providing the base with an opening formed therethrough, disposing a tool adjacent to the base over the opening, and wherein said step (b) is performed by positioning the bearing cup adjacent to the tool.

3. The method defined in claim 1 wherein said ram is moved hydraulically.

4. The method defined in claim 1 wherein said ram is moved mechanically.

5. A method for removing a bearing cup from a universal joint including a cross having first and second trunnions, first and second bearing cups respectively mounted on the first and second trunnions, and a yoke having first and second openings formed therethrough respectively receiving the first and second bearing cups therein, said method comprising the steps of:

(a) providing an apparatus including a base having an orifice formed therethrough, a support disposed at a distance from the base, and a ram carried on the support and selectively movable toward the base;

(b) positioning the universal joint within the apparatus such that the yoke abuts the base and the first bearing cup is aligned with the orifice; and (c) moving the ram into engagement with the second bearing cup such that the cross is moved relative to the yoke and the first bearing cup is moved out of the first opening into the orifice.

6. The method defined in claim 5 wherein said ram is moved hydraulically.

7. The method defined in claim 5 wherein said ram is moved mechanically.

* * * * *